March 3, 1959 B. W. MOSS 2,876,444
BINARY CODE TRANSLATOR
Filed Aug. 9, 1956
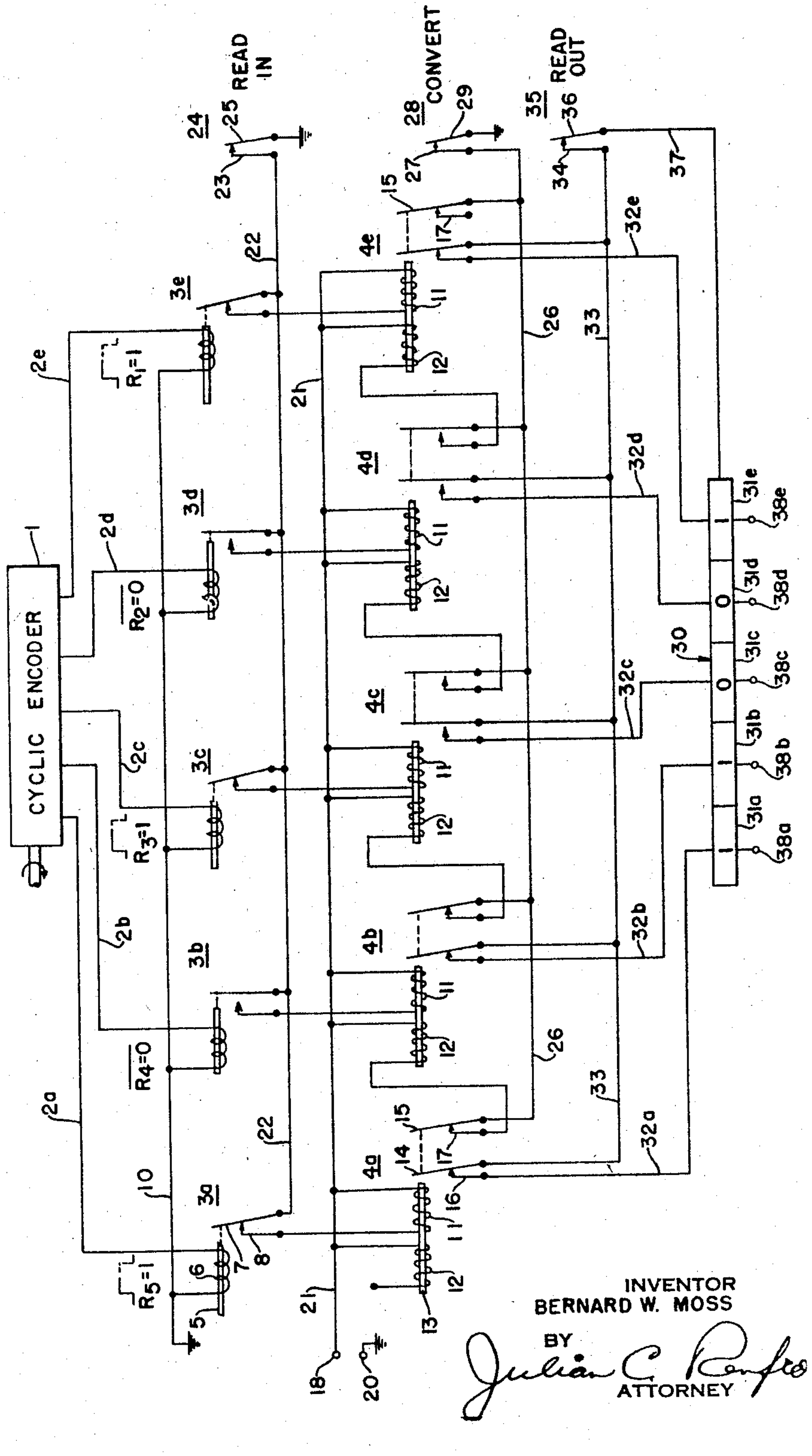
INVENTOR
BERNARD W. MOSS
BY Julian C. Renfro
ATTORNEY

United States Patent Office 2,876,444
Patented Mar. 3, 1959

2,876,444

BINARY CODE TRANSLATOR

Bernard William Moss, Summit Park, Md., assignor to The Martin Company, a corporation of Maryland Application August 9, 1956, Serial No. 603,061
15 Claims. (Cl. 340—347)

This invention relates to apparatus for manipulating binary digital codes and more particularly to apparatus for translating cyclic binary digital codes to standard binary digital codes.

It is well known in the arts of data transmission and digital computation that, of the several different forms of binary digital notation and the respective code groups constructed thereon, each has its own particular advantages for particular purposes. For example, it is known that the so-called reflected or cyclic binary digital number notation is particularly useful because of its non-ambiguity for purposes of encoding analogue information in digital form. On the other hand, standard binary digital notation and the code groups based thereon are simpler and more practical in digital computing operations. If the advantages peculiar to each system of notation are to be realized in practical applications, the need for means for translating the code groups in one notational system into code groups of another system of notation is apparent. It is equally apparent that, if the translating apparatus is to have practical utility, it must be capable of high-speed operation so that it may be incorporated directly in a system utilizing both cyclic binary code groups and standard binary code groups.

It is known that the theoretical basis for translating from the reflected or cyclic binary notation to the standard binary notation is given by the following expressions:

$$\left.\begin{array}{l} C_n = R_n \\ C_{n-1} = R_n + R_{n-1} \\ \quad\vdots \qquad \vdots \qquad \vdots \\ C_5 = \cdots\cdots\cdots + R_5 \\ C_4 = \cdots\cdots\cdots R_5 + R_4 \\ C_3 = \cdots\cdots\cdots R_5 + R_4 + R_3 \\ C_2 = \cdots\cdots\cdots R_5 + R_4 + R_3 + R_2 \\ C_1 = \cdots\cdots\cdots R_5 + R_4 + R_3 + R_2 + R_1 \end{array}\right\} \text{(Mod. 2)}$$

In these expressions the symbol $R_n$, $R_{n-1}$, etc., represent the coefficients of the several digits in the reflected or cyclic notation and the symbols $C_n$, $C_{n-1}$, etc., represent the coefficients of the several digits in the conventional or standard binary notation. Since both notations are binary, each R and each C may have the value 1 or the value 0, but no other. Therefore, the proviso "Mod. 2" means that all even sums are written 0 and all odd sums are written 1.

Obviously, manual translation of a code group in cyclic notation to a code group in standard notation by means of these expressions, while not particularly difficult, is time consuming and tedious. Equally obvious is the fact that mechanical or electronic apparatus for performing the literal arithmetic operations indicated by these expressions would be extremely complicated.

I have found that a shortcut rule for translating code groups in cyclic binary notation to code groups in standard notation can be the basis for very simple and rapidly operating translation apparatus having a high degree of accuracy. The particular rule I apply is as follows:

Given a particular value expressed in cyclic binary notation, $R_nR_{n-1}$— — —$R_3R_2R_1$, where the R's are the coefficients of the respective digital positions and are either 0 or 1, (*a*) Carry the most significant 1 in cyclic notation to the corresponding digital position in standard binary notation, i. e., $R_n(1) \rightarrow C_n(1)$;

(*b*) Change the next digit $R_{n-1}(1) \rightarrow C_{n-1}(0)$ or $R_{n-1}(0) \rightarrow C_{n-1}(1)$;

(*c*) If the changed digit $C_{n-1}$ is 0, carry $R_{n-2}(1 \text{ or } 0) \rightarrow C_{n-2}(1 \text{ or } 0)$;

(*d*) If the changed digit $C_{n-1}$ is 1, change $R_{n-2}(1 \text{ or } 0) \rightarrow C_{n-2}(0 \text{ or } 1)$;

(*e*) If (*c*) or (*d*) results in $C_{n-2}(0)$, carry $R_{n-3}(1 \text{ or } 0) \rightarrow C_{n-3}(1 \text{ or } 0)$;

(*f*) If (*c*) or (*d*) results in $C_{n-1}(1)$, change $R_{n-3}$ $(1 \text{ or } 0) \rightarrow C_{n-3}(0 \text{ or } 1)$;

(*g*) Apply (*e*) or (*f*) or each next less significant digit including the least significant, each application being with respect to the value of the preceding digit.

According to my invention, apparatus for translating a cyclic binary digital code group to a standard binary digital code group according to the above rule comprises a switching device for each significant digital position of the cyclic code group. I also provide a standard code group utilization means which may be simply a separate circuit for each digital position of the standard code group, the several separate circuits being adapted to control apparatus which is responsive to the signals constituting the code group. Each of these circuits is controlled by the switching device for the like digital position in the cyclic code group. Cooperating with the switching devices are means for actuating the switching device corresponding to the first most significant digit in the cyclic code group and additional means for actuating the switching device corresponding to each next less significant digit only when the switching device for the preceding digit of the cyclic code group is actuated and the instant digit of the cyclic code group is a 0 or when the switching device for the preceding digit is not actuated and the instant digit of the cyclic code group is a 1. Of course, these limitations on the actuation of each next less significant digit switching device imply that the device is not actuated when the preceding digit switching device is not actuated and the instant digit of the cyclic group is a 0. The means recited for performing the functional operations specified can be relay-type apparatus of any suitable mechanical, electro-mechanical, or electronic type and can be arranged to be either conductive or non-conductive when not actuated.

A feature of my invention is that it may be embodied in apparatus which is fast acting and which comprises an iteration of a simple combination of components as many times as there are significant digits in the cyclic code group to be translated. The operation of the apparatus can be made certain and accurate and is easily adapted for cooperation with all types of encoding, decoding, pulse transmission and digital computing apparatus.

In the following specification I describe the embodiment of my invention. In the course of this description reference is made to the accompanying drawing in which the figure is a schematic representation of a binary code group translating apparatus.

In the figure I have illustrated an embodiment of my invention which is particularly adapted for translation of a group of signals representative of a number requiring five digital positions for its expression in the cyclic binary notation to a signal group representative of the same number in the standard binary notation. In the figure the block 1 represents any apparatus such as an encoding device for representing analogue information in terms of cyclic binary code signals. The apparatus has five parallel output channels 2*a*–*e*, incl., and the information in each channel is either a voltage at some arbitrary level representative of a 0 or it is a pulse of any suitable duration and different voltage which is representative of a 1. Since the several digits in a binary code take only the values 0 or 1, each of these channels is capable of representing either of the values. In the figure the channel 2a corresponds to the most significant digit in a five-position code group, the signal on the channel 2b corresponds to the next less significant digit and so forth through the channel 2e carrying a signal representative of the least significant digit. In the example following, the lowest order or least significant digit is called the first digit position and the highest order or most significant digit is taken as the fifth digit position for this five digit example.

For purposes of illustration it is assumed that the several channels are carrying signals representative of a code group expressing the decimal number twenty-five (25) in cyclic binary notation, i. e., 10101. The signal on 2a is a pulse ($R_5=1$), the signal on channel 2b is no pulse ($R_4=0$), the signal on channel 2c is a pulse ($R_3=1$), the signal on channel 2d is no pulse ($R_2=0$), and, finally, the signal on channel 2e is a pulse ($R_1=1$). Thus, the signal group is P—P—P.

In the following description the various components of the apparatus are shown in the positions they assume while translating the cyclic code group representing the number "25."

In this embodiment each of the channels 2a–e has associated therewith a solenoid-operated preset switch 3a–e, respectively. As shown in the drawing, each of the preset switches 3a–e is a single-pole, single-throw type having an armature 5 and an actuating coil 6. The armature moves the contact arm 7 from the open position when the coil 6 is not energized into engagement with the switch point 8 when the coil is energized. Each channel 2a–e is connected to one terminal of the coil 6 of its respective preset switch 3a–e and the other terminals of the several coils are connected to a common ground bus 10. Thus, when the encoder 1 produces a signal group such as P—P—P, which I have chosen for purposes of illustration, the coils 6 of the switches 3a–e will be energized accordingly and switches 3a, c, e will be closed, whereas the switches 3b and d will be open.

A double-pole translating switch is provided for each digital position as indiacted at 4a–e. Each of these switches has a pair of windings here called the main winding 11 and the transfer winding 12, respectively, which are wound on a common core 13 and are adapted to close the switch when one or the other of the windings is energized. The magnetic characteristics of these windings and their connections are such that when both are energized, their fields cancel and the switch remains open.

Each of the switches 4a–e has a pair of contact arms 14 and 15. Switch point 16 cooperates with the contact arm 14 while switch point 17 cooperates with the contact arm 15. While all switches 4a–e may be identical in construction, it will appear below that the connections and functions of the switches 4a and 4e are not entirely identical to the functions of switches 4b, c and d.

The main windings 11 of the translating switches 4a–e are energized by a suitable voltage applied at the terminals 18 and 20, the latter being connected to ground, and are controlled by the preset switches 3a–e. A common lead 21 is connected between terminal 18 and one terminal of each of the windings 11. The other terminal of the winding 11 of each switch 4a–e is connected to the switch point 8 of the associated preset switch 3a–e. The contact arms 7 of switches 3a–e are all connected by a common lead 22 to switch point 23 of a "read-in" switch 24 and the contact arm 25 of the switch is connected to ground to provide a complete circuit for each of the main windings 11. The switch may be of the manually operated type or it may be a relay, the operation of which is dependent on some external event.

Now, if the encoder 1 is delivering the signal group P—P—P and the "read-in" switch 24 is closed, as illustrated, the windings 11 of transfer switches 4a, c, e will be energized, whereas the windings 11 of translating switches 4b and d will not be energized.

Turning now to the circuits for the transfer windings 12 of the switches 4a–e, it is seen in the figure that one terminal of the winding 12 of the switch 4a is connected to the common lead 21 while the other terminal is open-circuited. It is apparent that this coil will have no effect insofar as the most significant digit represented by the signal on channel 2a is concerned. However, each of the windings 12 of the translating switches 4b–e has one terminal connected to the common lead 21 and has its other terminal connected to the switch point 17 of the preceding translating switch for the next more significant digit.

The contact arm 15 of each switch 4a–e is connected to a common lead 26 and this lead is, in turn, connected to switch point 27 of "convert" switch 28. Contact arm 29 of the latter switch is connected to ground to provide a complete circuit. Switch 28 may also be a manually operated or relay operated type.

Now, it is apparent that only the winding 11 of translate switch 4a is effective to close the contact arm 15 of that switch. When the main winding 11 is energized in response to a pulse on channel 2a the contact arm 15 of switch 4a will be moved into engagement with switch point 17 and the transfer winding 12 of switch 4b will be energized, provided only that the "convert" switch 28 is closed.

Switch 4b is subject to three significant conditions. The first of these arises when the digit $R_5$ of the cyclic code group to be translated is a 1 which produces a pulse in channel 2a. By previously described means the preset switch 3a will be actuated and the main winding 11 of translating switch 4a will be energized, thereby closing the contact arms 14 and 15. Now, with the "convert" switch 28 closed transfer winding 12 of translating switch 4b will be energized. Suppose also that the next less significant digit $R_4$ of the code group produced by the encoder is a 1 and results in a pulse on channel 2b. Preset switch 3b will be actuated and winding 11 of translating switch 4b will be energized. The reader will remember that the windings 11 and 12 of the translating switches are constructed so that their simultaneous energization results in cancelation of their fields and the contact arms 14 and 15 will remain open. Such will be the case with switch 4b when the most significant digit, $R_5$, and the next less significant digit, $R_4$, of the code group to be translated are both 1, i. e., the signals on channels 2a and 2b are both pulses.

The second condition to which switch 4b is subject arises when the most significant digit, $R_5$, of the code group is a 1 and the next less significant digit, $R_4$, is a 0. Then the signal in channel 2a will be a pulse whereas the signal in channel 2b will be no pulse. Accordingly, translating switch 4a will be actuated so that the transfer winding 12 of translating switch 4b is again energized. However, with no pulse on channel 2b, the preset switch 3b will not be actuated and the main winding 11 of switch 4b will not be energized. In this second case, the armature of switch 4b will be under the control of the transfer winding 12 and will be moved to the left.

In the third case the digit in the fifth position is a 0. Then switch 4b will be strictly under the control of a pulse on channel 2b representative of a 1 in the fourth position and the contact arms 14 and 15 of switch 4b will be closed.

It need only be noted that there is a fourth and trivial condition which may arise when the digits in the fifth and fourth positions are both 0, i. e., the signals on channels 2a and 2b are both no pulse. In this case, neither prese 4*d* is not energized. Moreover, the main winding 11 of switch 4*d* is not energized inasmuch as the signal in channel 2*d* is no pulse which corresponds to a 0 in the second position of the cyclic code group. Because neither winding of the switch 4*d* is energized, the switch will remain open. Consequently, no circuit is established to the second position 31*d* of register 30. This corresponds to part (*e*) of the rule which requires that, if the application of parts (*c*) or (*d*) results in a 0 in the third position of the standard binary code group, then the digit in the second position of the cyclic code group is to be carried to the second position of the standard code group.

Switch 4*d* being open, no circuit is established to the transfer winding 12 of switch 4*e* and this winding remains unenergized. However, the pulse on the channel 2*e*, corresponding to the 1 on the first position of the cyclic code group, actuates the preset switch 3*e* to establish a circuit to the main winding 11 of switch 4*e*. This, in turn, actuates the contact arm 14 of the switch to the left to engage switch point 16 thereby closing a circuit to the first position 31*e* of the register 30. This corresponds to an iteration of the application of part (*e*) of the rule according to part (*g*). Specifically, the digit in the second position of the standard code group is a 0; therefore, the digit in the first position of the cyclic code group is carried to the first position in the standard code group.

Closing the "read-out" switch 35 causes the register 30 to display the several digits of the standard code groups simultaneously. As shown, the group is 11001. This may be checked by application of the conventional rule for translating standard binary notation to decimal notation as follows:

$$C_5(1)\times 2^4=16$$
$$C_4(1)\times 2^3=8$$
$$C_3(0)\times 2^2=0$$
$$C_2(0)\times 2^1=0$$
$$C_1(1)\times 2^0=1$$

25 (check)

A unique feature of my new translating apparatus is that it may be used, whenever desirable, merely to transmit the cyclic code from the encoder 1 or signal input apparatus directly to the register 30 without performing the translating operation. This is accomplished by leaving the "convert" switch 28 open and closing only the "read-out" switch 35 after the preset switches 3*a*–*e* have been energized in accordance with the particular cyclic code group to be transmitted. For example, suppose it is desired to set the cyclic group 10101 representing the number 25 into the register 30. As stated earlier this code group will close translating switches 4*a*, 4*c*, 4*e* and switches 4*b* and 4*d* will remain open if the "convert" switch is not closed. Under these conditions, closing the "read-out" switch will complete circuits to register positions 31*a*, 31*c*, 31*e* but not to positions 31*b* or 31*d* and the cyclic code group 10101 will appear on the register 30. This feature of my invention is inherent in this particular embodiment and does not require any modification of the apparatus.

Numerous modifications of this particular embodiment of my invention may be made. For example, other types of switches and switching devices which will perform the same functions may be substituted for those illustrated. In particular cases some of the components illustrated may be dispensed with. Therefore, I do not intend that the scope of my invention be limited to the exact details of this particular embodiment. The scope of my invention is defined in the subjoined claims.

I claim:

1. Apparatus for translating a cyclic binary digital code group representing a given number to a standard binary digital code group representing the same number, which apparatus comprises a bi-stable switching means for each digital position of the cyclic code group, a standard code group utilization means having at least a separate circuit for each digital position of the standard code group, each circuit being controlled by the switching means of the like digital position of the cyclic code group, means for establishing the switching means for the most significant digit of the cyclic code group in its first stable condition, and means for establishing each next less significant digit switching means in its first stable condition only when the switching means for the preceding digit is in its first stable condition and the instant digit of the cyclic code group is a 0 or when the preceding switching means is in its second stable condition and the instant digit of the cyclic code group is a 1.

2. Apparatus for translating a cyclic binary digital code group representing a given number to a standard binary digital code group representing the same number, which apparatus comprises a bi-stable switching means for each digital position of the cyclic code group, a standard code group utilization means having at least a separate circuit for each digital position of the standard code group, each circuit being controlled by the switching means of the like digital position of the cyclic code group, means for establishing the switching means for the most significant digit of the code group in its first stable condition, and means for maintaining each next less significant switching means in its second stable condition when the preceding digit switching means is in its first stable condition and the instant digit of the cyclic code group is a 1.

3. Apparatus for translating a cyclic binary digital code group representing a given number to a standard binary digital code group representing the same number, which apparatus comprises a bi-stable switching means for each digital position of the cyclic code group, a standard code group utilization means having at least a separate circuit for each digital position of the standard code group, each circuit being controlled by the switching means of the like digital position of the cyclic code group, means for establishing the switching means for the most significant digit of the cyclic code group in its first stable condition, means for establishing each next less significant digit switching means in its second stable condition when the preceding digit switching means is in its first stable condition and the instant digit of the cyclic code group is a 1, and means for establishing each next less significant digit switching means in its first stable condition when the preceding digit switching means is in its first stable condition and the instant digit is a 0 and when the preceding digit switching means is in its second stable condition and the instant digit is a 1.

4. Apparatus for translating a cyclic binary digital code group representing a given number to a standard binary digital code group representing the same number, which apparatus comprises standard code group utilization apparatus having a separate responsive means for each digital position of the code groups, means for bi-stable control of each responsive means, means for actuating the control means corresponding to the most significant digit of the cyclic code group, means for actuating the control means for the first next less significant digital position only when the digit in that position of the cyclic code group is a 0, and means for actuating the control means for the second next less significant digital position only when the digit in that position of the cyclic code group and the digit in the preceding digital position of the standard code group are dissimilar.

5. Apparatus for translating a cyclic binary digital code group representing a given number to a standard binary digital code group representing the same number, which apparatus comprises a plurality of normally open, double pole, relay operated switches, there being one of said switches for each digit of the cyclic code group, a standard code group utilization means having a separate circuit for each digital position of the standard code group, each circuit being controlled by one pole of the switch 3*a* or 3*b* is actuated and both translating switches 4*a* and 4*b* will remain open.

Consider now the translating switches associated with the channels 2*b* and 2*c* for the fourth and third digital positions, respectively, switches 4*c* and 4*d* for the third and second digital positions, respectively, and the switches 4*d* and 4*e* for the second and first digital positions, respectively. It is seen that the connections of the components are similar in all respects with the exception that the contact arm 15 and switch point 17 of switch 4*e* are open circuited and hence play no part in the operation of the overall circuit. In view of the fact that the transfer winding 12 of switch 4*b* is an operative element, whereas the corresponding winding of switch 4*a* is inoperative, the combination of switches 4*b* and 4*c* can have additional conditions of cooperation in addition to those modes of cooperation described in connection with switches 4*a* and 4*b*. As previously described, different combinations of signals in the channels 2*a* and 2*b* can result in switch 4*b* remaining open or being closed. Accordingly, the switch 4*c* will respond in various ways depending on the character of the signal on channel 2*c*. First, if switch 4*b* is closed, thereby energizing the transfer winding 12 of the switch 4*c*, and the signal on channel 2*c* is a pulse so that the main winding 11 is also energized, then the switch 4*c* will remain open with the contact arms 14 and 15 out of engagement with the switch points. Transfer winding 12 of switch 4*d* will not be energized under these conditions.

On the other hand, if switch 4*b* is closed and the signal on channel 2*c* is no pulse so that the main winding 11 of switch 4*c* is not energized, then the transfer winding 12 of this switch will control the contact arms 14 and 15 and they will close on the switch points 16 and 17. In contrast, if the combination of signals on channel 2*a* and 2*b* for digits in the fifth and fourth positions of the code group result in switch 4*b* remaining open so that transfer winding 12 of switch 4*c* is not energized, then the main winding 11 will control the switch 4*c*. Accordingly, a 1 in the third digital position of the cyclic code group will result in a pulse in channel 2*c* which will cause the main winding of switch 4*c* to close that switch. On the other hand, if the digit in the third position is a 0, the signal in channel 2*c* will be no pulse and the main winding 11 of switch 4*c* will not be energized. With both the transfer winding 12 and the main winding 11 de-energized the switch will remain open.

A similar analysis will show that the operation of switch 4*c* is reflected in the energization of transfer winding 12 of switch 4*d* and that the cooperation between switches 4*c* and 4*d* and between 4*d* and 4*e* is the same in all respects as the cooperation between switches 4*b* and 4*c*.

Returning now to the description of the circuitry, I provide in this embodiment a five-position register 30 on which the translation of the five-position cyclic code group appears as a five-position digital code in standard binary notation. The register has positions 31*a–e*, corresponding to the fifth through the first positions of the binary notation, respectively.

Each position 31*a–e* of the register is connected to switch points 16 of the translating switches 4*a–e* by leads 32*a–e*, respectively. The contact arms 14 of switches 4*a–e* have a common connection 33 to switch point 34 of a "read-out" switch 35 and the contact arm 36 of this "read-out" switch is returned to the register 30 by means of the connection 37 to complete the circuits. Switch 35 may be manually or relay operated as is convenient in a particular application.

Now with the "read-out" switch closed and any one of the translating switches 4*a–e* closed the contact arm 14 of the translating switch will engage the switch point 16 thereof to form a complete circuit to the corresponding digital position of the register 30. That position of the register will then show a 1. On the other hand, if any one of the translating switches remains open the circuit to the corresponding position of the register will remain open and the register will show a 0 for that position.

At 38*a–e* I have shown terminals on the register 30 by which the standard code group may be transferred to other apparatus.

It will be apparent to one familiar with systems of relays that the translating operation performed by my new apparatus is fast and accurate. The total time required to translate an entire code group having *n* places will be only *n* times the period required for one relay to operate.

The operation of the illustrated embodiment will now be described as it applies to the cyclic binary code group representing the decimal number twenty-five (25). As previously stated, twenty-five is represented in cyclic binary digital notation as 10101 and the signal group will be P—P—P as previously described. This signal group will cause the preset switches 3*a–e* to be actuated or not depending on the presence or absence of a pulse in the corresponding channels 2*a–e*. Therefore, preset switch 3*a* will be actuated, switch 3*b* will not, switch 3*c* will be actuated, switch 3*d* will not, and switch 3*e* will be actuated. Then the closed "read-in" switch 24 will complete circuits energizing the main windings 11 on translating switches 4*a*, 4*c* and 4*e*, and the contact arms of these three translating switches will immediately be closed on their associated contact points. Upon the closing of "convert" switch 28, the transfer windings 12 will be energized to cause the apparatus to make the translation according to the short-cut rule stated in full above.

First, it is noticed that switch 4*a* is closed in response to the pulse on channel 2*a*. Engagement of the contact arm 14 with the switch point 16 of switch 4*a* sets up a circuit to position 31*a* of the register 30. Thus, the apparatus has complied with part (*a*) of the rule requiring that the most significant 1, i. e., the one in position $R_5$, of the cyclic binary code group be carried to the corresponding position in the standard binary code group.

The switch 4*a* being closed, the contact arm 15 also engages switch point 17 which completes a circuit to the transfer winding 12 of switch 4*b*. Inasmuch as the next less significant digit, i. e., that in the fourth digital position of the cyclic code group, is a 0, the main winding 11 of switch 4*b* is not energized through the switch 3*b*; therefore, the switch 4*b* is controlled by the energized transfer winding 12. This will cause the switch 4*b* to close. The circuit to the fourth position of the register 30 is thereby completed through the contact arm 14 and switch point 16 of switch 4*b* and part (*b*) of the rule has been complied with; namely, that the next less significant digit of the cyclic code be changed from 1 to 0 or 0 to 1. The 0 in the fourth position of the cyclic code group has been changed to a 1 in the fourth position of the standard code group.

Now, with switch 4*b* closed, the contact arm 15 engages the switch point 17 and a circuit is established to energize the transfer winding 12 of switch 4*c*. Here the main winding 11 is also energized due to the pulse in channel 2*c* corresponding to the 1 in the third digital position of the cyclic code group. Therefore, the switch 4*c* will return to its open position while the windings 11 and 12 are simultaneously energized. The result is that the contact arms of this switch are out of engagement with their associated switch points and no circuit is established to the third digital position 31*c* of the register 30. Part (*d*) of the rule has been complied with. Since the digit in the fourth position in the standard code group is a 1 the digit in the third position of the cyclic code group, a 1, is changed to a 0.

It is noted that part (*c*) of the rule is inapplicable in this particular case.

With the switch 4*c* open, the transfer winding of switch relay switch for the corresponding digital position of the cyclic code group, the most significant digit switch having a main winding and each switch other than said most significant digit switch having a main winding and a transfer winding, said main and transfer windings of each switch being arranged to actuate the switch when separately energized but not when simultaneously energized, circuit means for energizing each main winding when the corresponding cyclic group digit is a 1 and circuit means including the second pole of the preceding digit switch for energizing the transfer winding of each digit switch when the preceding digit switch is actuated.

6. Apparatus for translating a cyclic binary digital code group representing a given number to a standard binary digital code group representing the same number, which apparatus comprises a separate input channel for each digital position of the cyclic code group and is adapted to be energized at different voltages according to whether the coefficient of the digit in the corresponding position of the cyclic code group is a 1 or a 0, a preset switch for each channel which is arranged to be closed when the voltage on the channel is representative of a 1, a double pole translate relay switch for each digital position of the cyclic code group, each translate switch being provided with a main winding and a transfer winding and adapted to be closed when either winding is energized and to remain open when both windings are energized, an energizing circuit for the main winding of each translate switch controlled by the preset switch for the corresponding digital position of the cyclic code group, an energizing circuit for the transfer winding of each translate switch, which transfer circuit is controlled by one pole of the translate switch for the preceding digital position of the cyclic code group, and an output circuit for each digital position of the standard code group, which output circuit is controlled by the other pole of the translate switch for the corresponding digital position of the cyclic code group.

7. Apparatus according to claim 6 which includes a convert switch common to all of said circuits for energizing the transfer windings.

8. Apparatus according to claim 6 which includes a convert switch common to all of said circuits for energizing the transfer windings, and a read-out switch common to all of said output circuits.

9. Apparatus for translating a cyclic binary digital code group representing a given number to a standard binary digital code group representing the same number, which apparatus comprises a separate input channel for each digital position of the cyclic code group and adapted to be energized at different voltages according to whether the cofficient of the digit in the corresponding position of the cyclic code group is a 1 or a 0, a preset relay device for each channel which is arranged to be conductive when the voltage on the channel is representative of a 1 and non-conductive when the voltage is representative of a 0, a double pole translate relay switch for each digital position of the cyclic code group, each translate switch being provided with a main winding and a transfer winding, said transfer switch adapted to be closed when either winding is energized and to remain open when both windings are energized, an energizing circuit for the main winding of each translate switch controlled by the preset relay device for the corresponding digital position, an energizing circuit for the transfer winding of each translate switch controlled by one pole of the translate switch for the preceding digital position of the cyclic code group, and an output circuit for each digital position of the cyclic code group controlled by the other pole of the translate switch for that digital position.

10. Apparatus for translating a cyclic binary digital code group representing a given number to a standard binary digital code group representing the same number, which apparatus comprises a separate input channel for each digital position of the cyclic code group and adapted to be energized at different voltages according to whether the coefficient of the digit in the corresponding position of the cyclic code group is a 1 or a 0, a preset relay device for each channel which is arranged to be conductive when the voltage on the channel is representative of a 1 and non-conductive when the voltage is representative of a 0, a translate relay switch for each digital position of the cyclic code group, each translate switch being provided with a main winding and each translate switch other than the one for the most significant digit being provided with a transfer winding, said translate switches having both transfer and main windings being arranged to be closed when either winding is energized and to remain open when both windings are energized, an energizing circuit for the main winding of each translate switch which is controlled by the preset relay device for the corresponding digital position, an energizing circuit for each transfer winding, which transfer circuit is controlled by the translate switch for the preceding digital position of the cyclic code group, and an output circuit for each digital position of the code group, which output circuit is controlled by the translate switch for that digital position.

11. Apparatus according to claim 10 which includes a convert switch common to all of said circuits for energizing the transfer windings.

12. Apparatus according to claim 10 which includes a convert switch common to all of said circuits for energizing the transfer windings, and a read-out switch common to all of said output circuits.

13. Apparatus for translating a cyclic binary digital code group representing a given number to a standard binary digital code group representing the same number, which apparatus comprises a separate input channel for each digital position of the cyclic code group and adapted to be energized at different voltages according to whether the coefficient of the digit in the corresponding position of the cyclic code group is a 1 or a 0, a translate relay switch for each digital position of the cyclic code group, each translate switch being provided with a main winding and each translate switch other than the one for the most significant digit being provided with a transfer winding, said translate switches having both transfer and main windings being arranged to be closed when either winding is energized and to remain open when both windings are energized, an energizing circuit for the main winding of each translate switch which is adapted to be energized when the voltage on the input channel is representative of a 1 and de-energized when the voltage is representative of a 0, an energizing circuit for each transfer winding, which transfer circuit is controlled by the translate switch for the preceding digital position, and an output circuit for each digital position of the code group, which output circuit is controlled by the translate switch for that digital position.

14. Apparatus according to claim 13 which includes a convert switch common to all of said circuits for energizing the transfer windings.

15. Apparatus according to claim 13 which includes a convert switch common to all of said circuits for energizing the transfer windings, and a read-out switch common to all of said output circuits.

References Cited in the file of this patent

UNITED STATES PATENTS

| | | |
|---|---|---|
| 2,685,084 | Lippel | July 27, 1954 |
| 2,714,204 | Lippel | July 26, 1955 |
| 2,762,563 | Sampson | Sept. 11, 1956 |